Figure 1:
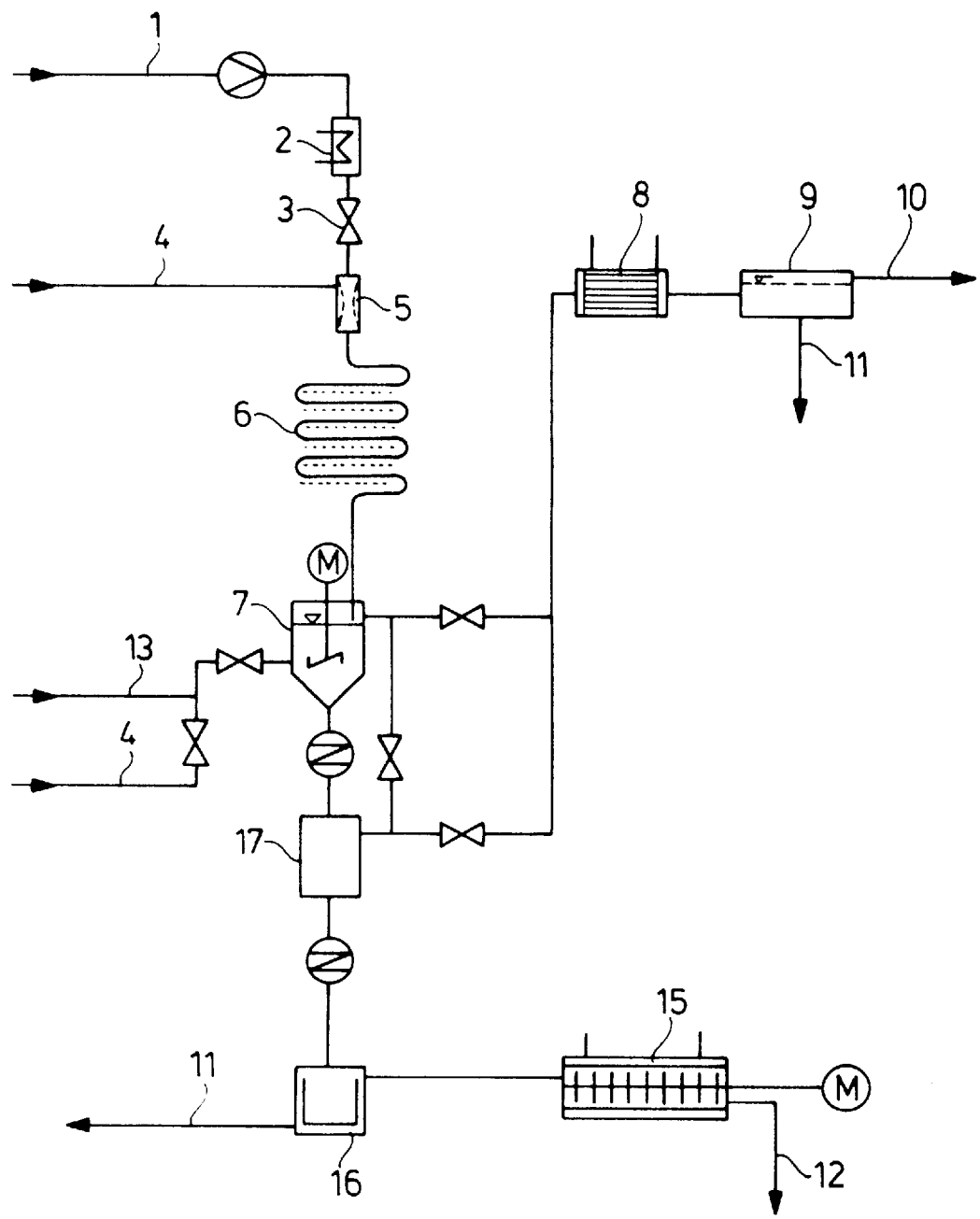

United States Patent

Zaby et al.

[11] Patent Number: 5,852,157
[45] Date of Patent: Dec. 22, 1998

[54] PROCESS FOR THE PRODUCTION OF POLYCARBONATE AGGLOMERATE

[75] Inventors: Gottfried Zaby, Leverkusen; Clemens Casper, Krefeld; Klemens Kohlgrüber, Kürten; Hugo Obermann, Dormagen, all of Germany

[73] Assignee: Bayer Aktiengesellschaft, Germany

[21] Appl. No.: 810,263

[22] Filed: Mar. 3, 1997

[30] Foreign Application Priority Data

Mar. 6, 1996 [DE] Germany ............... 196 08 521.7

[51] Int. Cl.$^6$ ................................................. C08G 64/00
[52] U.S. Cl. ............................................. 528/196; 528/198
[58] Field of Search ............................. 528/196, 198

[56] References Cited

U.S. PATENT DOCUMENTS

| | | | |
|---|---|---|---|
| 3,508,339 | 4/1970 | Neblett | 528/196 |
| 4,212,967 | 7/1980 | Govoni et al. | 528/500 |
| 4,568,418 | 2/1986 | Walko et al. | 159/481 |
| 5,317,083 | 5/1994 | Freitag et al. | 528/499 |
| 5,475,084 | 12/1995 | Okamoto et al. | 528/500 |

FOREIGN PATENT DOCUMENTS 0 616 002 A1  12/1995  European Pat. Off. .

*Primary Examiner*—Terressa Mosley
*Attorney, Agent, or Firm*—Connolly & Hutz

[57] ABSTRACT

This invention relates to a process for the production of polycarbonate agglomerate of high bulk density from polycarbonate solutions, in which the organic solvent is stripped from a solution of polycarbonate by means of steam, and which is characterised in that the resulting suspension of polycarbonate particles, condensed water and water- and solvent vapor is fed in a tube or tubular heat exchanger to a separator which is partially filled with water and which is under elevated pressure. The polycarbonate agglomerates are discharged, together with part of the water, via a pressure lock at the bottom of the separator.

10 Claims, 2 Drawing Sheets

PROCESS FOR THE PRODUCTION OF POLYCARBONATE AGGLOMERATE

This invention relates to a process for the production of polycarbonate agglomerate of high bulk density from polycarbonate solutions, in which the organic solvent is stripped from a solution of polycarbonate by means of steam, and which is characterised in that the resulting suspension of polycarbonate particles, condensed water and water- and solvent vapour is fed in a tube or tubular heat exchanger to a separator which is partially filled with water and which is under elevated pressure. The polycarbonate agglomerates are discharged, together with part of the water, via a pressure lock at the bottom of the separator.

In a variant of the process, the suspension of polycarbonate particles, condensed water and water- and solvent vapour described above is separated from water and solvent vapours in a cyclone. The polycarbonate particles are freed from adhering solvent by steam stripping in a tower drier connected downstream, and are subsequently compacted in a vessel under pressure at a temperature which corresponds to the glass transition temperature of the polycarbonate.

After a crude separation of the water by straining or centrifuging or both, the agglomerates are subsequently dried in a contact drier. The polycarbonate agglomerates which are obtained in this manner are characterised by a high bulk density, a narrow grain size distribution and an extremely low content of residual solvent.

The isolation of polycarbonates from their solutions using steam is known in the art.

Thus U.S. Pat. No. 3 508 339 describes the use of a special nozzle in combination with a mixing chamber in which polycarbonate solution and steam are combined, and a subsequent tube of constant diameter in which the solvent is dried off.

U.S. Pat. No. 4 212 967 (which corresponds to EP 3996) describes the combination of a nozzle of the de Laval type with a heated tube, the diameter of which increases starting at the nozzle.

U.S. Pat. No. 4 568 418 describes the combination of a nozzle with a consecutive agglomeration tube, wherein the tube is characterised by a constant diameter and by at least six semicircular loops.

The polycarbonate agglomerates obtained by these processes have a low bulk density, however. Moreover, these processes require a high usage of steam which impairs their economic efficiency.

European Patent EP 0 616 002 A1 describes a process for the production of polycarbonate powder of high bulk density from polycarbonate solutions in methylene chloride by combining steam with the polycarbonate solution in a nozzle to which an unheated holding tube is attached.

Polycarbonate particles which are substantially free from organic solvent are obtained by these known processes (residual solvent content about 1 to 10% by weight). In order to obtain very low residual solvent contents (residual solvent content <2 to 5 ppm), a subsequent drying stage is necessary for each process.

However, the polycarbonate particles which are obtained by the processes which have hitherto become known have a capacity for subsequent drying which is still not completely satisfactory. This therefore necessitates the use of apparatuses of large volume and a high energy usage in order to dry them.

In German Patent Application DE 4224025 A1, a good capacity for subsequent drying is in fact achieved by spray evaporation in tubes with constrictions, but the bulk density of the agglomerates obtained by this process is significantly less than that which is aimed at for further processing.

It has surprisingly been found that the agglomerates obtained on the isolation of thermoplastic aromatic polycarbonates from their solutions by splitting by means of steam and further concentration in a tube or tubular heat exchanger are freed from solvent and are simultaneously compacted by separation in a vessel which is partially filled with water and which is under pressure, and that, after the separation of the water and drying off the residual moisture, agglomerates are obtained which have a uniform grain size distribution, a high bulk density and contents of residual solvents which are particularly low.

The process for the production of polycarbonate agglomerates of high bulk density is characterised in that a solution of 3 to 30% by weight, preferably 12 to 25% by weight of polycarbonate in a solvent, preferably dichloromethane, is mixed in a nozzle with steam at 100° to 300° C., preferably 190° to 200° C., and at a pressure of 2 to 100 bar, preferably 15 to 30 bar, and this mixture is conveyed in a tube or in a tubular heat exchanger with a length to diameter ratio of 100 to 10,000, preferably 300 to 1000, to a separator, the volume of which is 80 to 200 litres with respect to a throughput of 10 kg polycarbonate per hour, the height of which is 0.5 to 1.5 times its diameter and which is filled to 50 to 75% of its volume with water, in which the gaseous components of the mixture flowing in are separated at a pressure of 0.9 to 7 bar, preferably 3 to 5 bar, and at a temperature of 120° to 180° C., preferably 140° to 160° C. In particular, the temperature of the tubular heat exchanger is 150 to 220° C.

The separator may be provided with a stirrer, the stirring speed of which is 2 to 50 rpm, preferably 10 rpm.

The polycarbonate particles are taken off from the bottom of the separator, together with water, at intervals of 5 to 30 minutes, preferably 5 to 10 minutes, via a pressure lock, are depressurised to atmospheric pressure and are separated from entrained water by straining or centrifuging or both. The water which is removed with the agglomerates is replaced or is optionally recycled, by introducing heated pressurised water and steam, for example. The residual moisture of the granules is removed by drying, e.g. in a tray drier at a heating temperature of 120° C. to 150° C.

The solvent vapours obtained are led off from the vessel, preferably via a vapour line in which an expansion valve is installed for adjusting the pressure and maintaining it constant, to a condenser in which they are condensed.

In a variant of the process according to the invention, which is also a subject of the present invention, a cyclone is used as the separator instead of the pressurised vessel described above. The separated agglomerates are fed from the cyclone to a tower drier connected downstream of the cyclone and are freed from solvent there by the passage of steam, e.g. at a temperature of 100° to 110° C., for 30 to 120 minutes, preferably from 90 to 120 minutes. The steam-treated agglomerates are conveyed into the pressure vessel and agglomerated under elevated pressure and at a temperature at the glass transition temperature of the polycarbonate, with stirring, to form particles of higher bulk density.

The thermoplastic aromatic polycarbonates which are used in the sense of the process according to the invention are the known aromatic homopolycarbonates, copolycarbonates and mixtures of these polycarbonates which are derived from the following diphenols:

hydroquinone, resorcinol, dihydroxydiphenyl, bis-(hydroxyphenyl)-alkanes, bis-(hydroxyphenyl)-cycloalkanes, bis-(hydroxyphenyl)-sulphides, ethers, sulphoxides, and sulphones, and α,α'-bis-(hydroxyphenyl)- diisopropylbenzenes, as well as compounds thereof comprising alkylated and halogenated nuclei.

Examples of suitable diphenols are described in U.S. Pat. Nos. 3,028,365, 2,999,835, 3,062,781, 3,148,172 and 4,982,014, in DE-OS 1 570 703 and DE-OS 2 063 050, and in the monograph by H. Schnell, "Chemistry and Physics of Polycarbonates", Interscience Publishers, New York, 1964.

The preferred diphenols are:
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropylbenzene,
α,α'-b is-(4-hydroxyphenyl)-m-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane,
α,α'-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-1-phenyl-ethane,
2,2-bis-(3,5-dimethyl-4-hydroxyphenyl)-2-phenyl-ethane,
2,2-bis-(4-hydroxyphenyl)-2,2-diphenyl-ethane,
9,9-bis-(4-hydroxyphenyl)-fluorene,
9,9-bis-(3,5-dimethyl-4-hydroxyphenyl)-fluorene.

Examples of particularly preferred diphenols include:
2,2-bis-(4-hydroxyphenyl)-propane,
2,2-bis-(3,5-dimethyl-4-hydroxyphenyl)-propane,
1,1-bis-(4-hydroxyphenyl)-cyclohexane,
1,1-bis-(4-hydroxyphenyl)-1-phenyl-ethane,
1,1-bis-(4-hydroxyphenyl)-3,3,5-trimethylcyclohexane,
1,1-bis-(4-hydroxyphenyl)-3-methylcyclohexane,
1,-bis-(4-hydroxyphenyl)-4-methylcyclohexane,
9,9-bis-(3,5-dimethyl-4-hydroxyphenyl)-fluorene.

2,2-bis-(4-hydroxyphenyl)-propane, 1,1-bis-(4-hydroxyphenyl)-3,3,5-trimethylcyclohexane and 1,1-bis-(4-hydroxy-phenyl)-1-phenyl-ethane are particularly preferred.

Any mixtures of the aforementioned diphenols can also be used.

For the purpose of improving the flow behaviour, small amounts, preferably amounts between 0.05 and 2.0 mole % (with respect to the moles of diphenols used) of trifunctional compounds or compounds with a functionality greater than three, particularly those containing three or more than three phenolic hydroxyl groups, can also be used conjointly in the synthesis, in the known manner. Examples of some of the compounds which can be used include:
1,3,5-tris-(4-hydroxyphenyl)-benzene,
1,3,5-tris-(4-(4-hydroxyphenylisopropyl)-phenyl)-benzene,
1,1,1-tris-(4-hydroxyphenyl)-ethane,
2,6-bis-(2-hydroxy-5'-methyl-benzyl)-4-methylbenzene,
2-(4-hydroxyphenyl)-2-(2,4-dihydroxyphenyl)-propane,
hexakis-(4-(4-hydroxyphenylisopropyl)-phenyl)-ortho-terephthalic acid ester, tetrakis-(4-hydroxyphenyl)-methane,
1,4-bis-((4',4"-dihydroxytriphenyl)-methyl)-benzene,
3,3-bis-(4-hydroxyphenyl)-2-oxo-2,3-dihydroindole,
3,3-bis-(4-hydroxy-3-methyl-phenyl)-2-oxo-2,3-dihydroindole.

The chlorocarboxylic acids corresponding to these compounds are also suitable, as are the acids or preferably the acid chlorides of aliphatic or aromatic carboxylic acids with a basicity greater than two, namely, for example:
2,4-dihydroxybenzoic acid, or 2,4-dihydroxybenzoic acid dichloride, trimesic acid, or trimesic acid trichloride, trimellitic acid, or trimellitic acid trichloride, cyanuric acid trichloride,
wherein these branching agents may be placed in the synthesis vessel individually or in admixture or may be added in portions to the synthesis.

The polycarbonates or polycarbonate mixtures according to the invention can essentially be produced by the following known methods (see H. Schnell, "Chemistry and Physics of Polycarbonates", Polymer Review, Vol. IX, page 27 et seq., Interscience Publishers, New York, 1964):

1. by the melt transesterification process;
2. by the solution process in dispersed phase, which is termed the "phase boundary process".

The solutions concerned, of thermoplastic, aromatic polycarbonates in organic solvents, have concentrations between 3% by weight and 30% by weight, preferably between 12% by weight and 20% by weight.

Suitable organic solvents comprise all those which dissolve at least 5% by weight of the polycarbonates and which have a boiling point of not more than 150° C. The preferred solvents are dichloromethane, monochlorobenzene, toluene, tetrahydrofuran or 1,3-dioxolane, and mixtures of the said solvents. Dichloromethane is particularly preferred.

The steam used is at a temperature of 100° C. to 300° C., preferably 140° C. to 250° C. At the start of the process the polycarbonate solution is preferably at a temperature of 10° C. to 200° C., most preferably 20° C. to 120° C.

The weight ratio of the solvent of the polycarbonate solution to steam is 1:1 to 12:1 in particular. The ratio of the solvent of the polycarbonate solution to steam is preferably 3:1–5:1.

In particular, the point of admixture of steam into the polycarbonate solution is a T-shaped pipe section or a nozzle of the ejector type, preferably a nozzle of the ejector type. The agglomerate tube is straight or bent and has a length to diameter ratio of 10,000 to 100, preferably 1000 to 300, most preferably 900. The agglomeration tube with the dimensions given above may also be surrounded by a jacket tube and may then be used as a tubular heat exchanger. The temperature of the tubular heat exchanger is 150° C. to 300° C., preferably 200° C. to 220° C. The tube leads into a separator above the liquid column, at the interface between the liquid column and the gas space, or below the liquid column.

The separator may be a cylindrical vessel, for example, with a lower conical discharge part to which a cylindrical pipe section is attached which has an upper and a lower pressure-resistant gate valve. The compacted agglomerates which have descended to the bottom can periodically be discharged via this pressure lock. From the pressure lock, and after pressure equalisation with the atmosphere, the polycarbonate particles pass into a vessel which is provided with a strainer bottom of mesh width 0.5 mm for dewatering. The separator has a volume of 80 to 200 litres per 10 kg of polycarbonate particles per hour. The separator may be provided with a stirring device. The height of the separator is 0.5 to 1.5 times its diameter.

The polycarbonate agglomerates which can be obtained from the process according to the invention, and which also form a subject of the invention, can be processed to form mouldings, for example by extruding the previously isolated polycarbonate to form a granular material and processing this granular material by injection moulding, optionally after the addition of additives, colorants, fillers or glass fibres, to form various articles in the known manner.

The polycarbonate agglomerates produced according to the invention have a higher bulk density, of >280 g/litre in particular, and can be further processed directly in standard extruders without a gland for the screw or without prior compaction.

For most non-transparent applications, other thermoplastics may also be admixed with the polycarbonate agglomerates produced according to the invention in the usual amounts, i.e. between 10 and 50% by weight with respect to the polycarbonate according to the invention.

Examples of other suitable thermoplastics include polyester carbonates, which are optionally aromatic, polycarbonates based on bisphenols other than those of the polycarbonates according to the invention, polyalkylene terephthalates, EPDM polymers, polystyrene, and co- and graft polymers which are produced based on styrene, acrylonitrile and butadiene, such as ABS in particular.

The polycarbonate bodies from the agglomerate which is processed further are used in the customary manner, for example in the fields of electrical technology and optics, in vehicle construction and in the lighting industry.

Figure 2:
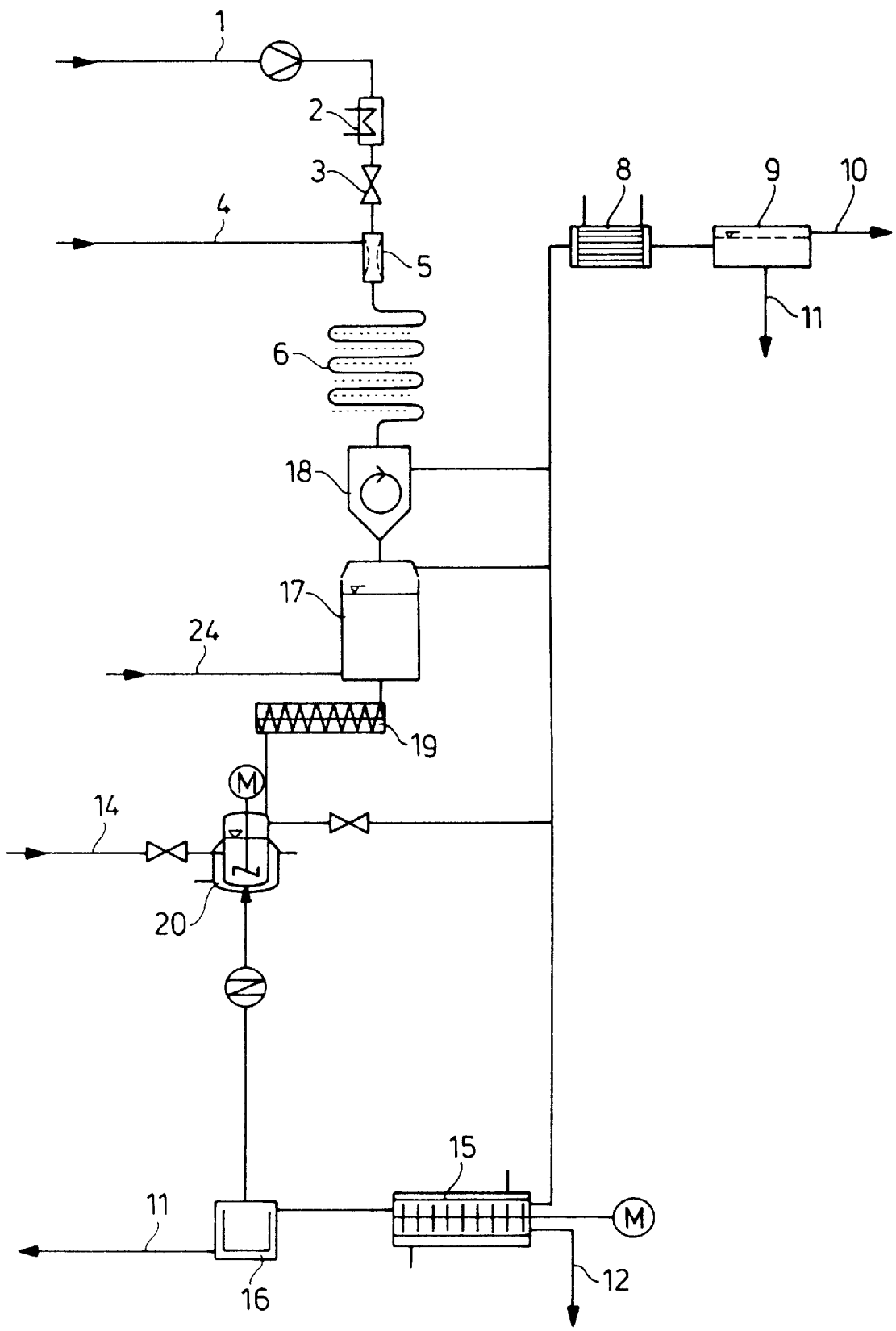

The invention is explained in more detail below by way of examples and with reference to the Figures: the Figures constitute examples of process arrangements which can be used for the process according to the invention, where:

FIG. 1 illustrates a schematic process arrangement which has a separator as the separating device for the volatile components of the mixture; and FIG. 2 illustrates a process arrangement which has a cyclone as the separating device and a downstream compaction stage for the PC agglomerate.

EXAMPLES

Example 1

25 kg polycarbonate based on bisphenol A, with an average molecular weight of $M_w$=29,800, was dissolved in 142 kg dichloromethane. 52.5 kg/hour of this 15% polycarbonate solution were mixed, via a heat exchanger 2 and a valve 3, in a nozzle 5 shaped as a T-piece with 11.2 kg/hour of steam 4 at a temperature of 195° C. and at a pressure of 14.5 bar (see FIG. 1). This mixture was conveyed through a tube 6 with an inside diameter of 6 mm, a wall thickness of 1 mm and a length of 6 m, which was surrounded by a jacket tube with an outside diameter of 18 mm (wall thickness 1.5 mm), to a cylindrical separator 7 which was provided with a conical discharge and which had a volume of about 200 litres. The cylindrical separator 7 had a height of 50 cm and a diameter of 70 cm, and had a lower, conical discharge part to which a cylindrical pipe section with an upper and lower pressure-resistant gate valve was attached. The compacted agglomerates which had fallen to the bottom were discharged every 5 minutes via this pressure lock into a cylindrical separator 17, from which, after pressure equalisation with the atmosphere, they were admitted into a further vessel 21 which was provided with a strainer bottom for dewatering.

The temperature of the solution of polycarbonate in dichloromethane was initially 23° C.; the jacket tube remained unheated. The solvent vapours were conveyed to a further heat exchanger and condensed.

The residual moisture was removed by drying for 4 hours at 120° C. in a drying oven. The dried agglomerate had a bulk density of 306 g/litre. No dichloromethane could be detected. The detection limit of the method of determination used for dichloromethane was 2 ppm.

The water which was removed with the polycarbonate agglomerates from the vessel was replaced by hot make-up water. The temperature in the vessel was maintained constant by the introduction of steam (16 bar, 195° C.). The solvent vapours were led off via a vapour line from the vessel, via an expansion valve set at 5 bar, and were condensed.

Example 2

55 kg/hour of the solution 1 of polycarbonate in dichloromethane described in Example 1 were mixed as described in Example 1 with 12 kg/hour of steam and were passed through the agglomeration tube 6 as described in Example 1. However, separation was effected in a cyclone 18 with a volume of 100 litres (see FIG. 2). The separated agglomerate was fed into a cylindrical tower drier 17 with an inside diameter of 200 mm and a height of 1200 mm. 5 kg/hour of steam 24 (T=150° C.) were passed through the 1000 mm high bed of agglomerate in the tower drier 17. After 45 minutes, agglomerate was continuously discharged from the tower drier 17 by means of a screw conveyor 19.

For the batch-wise compaction of the moist polycarbonate agglomerates, about 50 litres of the agglomerates were conveyed into a pressure-resistant stirred vessel 20 with a volume of 200 litres, which was filled with 110 litres of water. The vessel contents were heated via the jacket heater to 153° C. at a pressure of 5.1 bar, whilst stirring at a stirring speed of 10 rpm. The temperature of the heater was 200° C. After an internal temperature of 150° C. had been reached, the mixture was stirred for a further 30 minutes at this temperature. Thereafter the vessel 20 was depressurised to atmospheric pressure and the contents were separated from the water by straining. After drying for 4 hours at 120° C. in a drying oven, an agglomerate with a bulk density of 322 g/litre was obtained. The dichloromethane content was <2 ppm.

We claim:

1. A process for the production of polycarbonate agglomerate from polycarbonate solutions by the steam treatment of polycarbonate solutions and subsequent drying, characterised in that a solution (1) of 3 to 30% by weight of polycarbonate in an organic solvent is mixed in a nozzle (5) with steam (4) at 100° to 300° C. and at a pressure of 2 to 100 bar, the mixture is conveyed in a tube or in a tubular heat exchanger (6) with a length/diameter ratio of 100 to 10,000 to a separator (7), the volume of which is from 80 to 200 litres with respect to a throughput of 10 kg polycarbonate per hour, the height of which is 0.5 to 1.5 times its diameter and which is filled to 50 to 75% of its volume with water, and in which the gaseous components of the mixture flowing in are separated at a pressure of 0.9 to 7 bar and at a temperature of 120 to 180° C., the resulting mixture of polycarbonate particles and water is removed via a pressure lock from the separator bottom at intervals of 5 to 30 minutes, is depressurised to ambient pressure and is separated by straining or centrifuging, the polycarbonate is dried and the water removed from the separator (7) is optionally recycled to the process.

2. A process for the production of polycarbonate agglomerate from polycarbonate solutions by the steam treatment of polycarbonate solutions and subsequent drying, characterised in that a solution (1) of 3 to 30% by weight of polycarbonate in an organic solvent is mixed in a nozzle (5) with steam (4) at 100° to 300° C. and at a pressure of 2 to 100 bar, the mixture is conveyed in a tube or in a tubular heat exchanger (6) with a length/diameter ratio of 100 to 10,000 to a cyclone (18) in which the polycarbonate agglomerate is separated, that the separated polycarbonate agglomerates are fed to a tower drier (17) downstream of the cyclone (18) and are thereby freed from residual solvent by the passage of steam, that the steam-treated agglomerates are conveyed into a pressure vessel (20) and are further agglomerated to form polycarbonate particles, under elevated pressure and at a temperature near the glass transition temperature of the polymer, and with stirring.

3. A process according to claim 1, characterised in that a 12 to 25% by weight polycarbonate solution is used.

4. A process according to claim 1, characterised in that the polycarbonate solution is mixed in the nozzle (5) with steam at a temperature of 190° to 220° C. and at a pressure of 15 to 30 bar.

5. A process according to claim 1, characterised in that the length/diameter ratio of the tube or of the tubular heat exchanger (6) is 300 to 1000.

6. A process according to claim 1, characterised in that the separator pressure is from 3 to 5 bar and the temperature is from 140° to 160° C.

7. A process according to claim 1, characterised in that removal of the mixture of water and polycarbonate agglomerate is effected at intervals of 5 to 30 minutes.

8. A process according to claim 1, characterised in that the isolated process water is recycled as steam or as separator liquid.

9. A process according to claim 1, characterised in that the weight ratio of polycarbonate solvent to steam is from 1:1 to 12:1.

10. A process according to claim 1, characterised in that dichloromethane, monochlorobenzene, toluene, tetrahydrofuran or 1,3-dioxolane and mixtures of the said solvents, particularly dichloromethane, are used as the organic solvent for the polycarbonate.

* * * * *